United States Patent [19]

Ostertag et al.

[11] Patent Number: 4,629,616
[45] Date of Patent: Dec. 16, 1986

[54] BASIC CHROMIUM ALUMINUM SULFATES AND THEIR PREPARATION

[75] Inventors: Werner Ostertag, Gruenstadt; Henning Wienand, Neulussheim; Dietrich Lach, Friedelsheim; Erwin Hahn, Heidelberg, all of Fed. Rep. of Germany

[73] Assignee: BASF Aktiengesellschaft, Fed. Rep. of Germany

[21] Appl. No.: 589,769

[22] Filed: Mar. 15, 1984

[30] Foreign Application Priority Data

Mar. 22, 1983 [DE] Fed. Rep. of Germany ....... 3310270

[51] Int. Cl.$^4$ ...................... C01B 17/96; C01G 37/14; C14C 9/00
[52] U.S. Cl. .................................. 423/544; 423/128; 423/556; 423/595; 423/600; 252/8.57; 8/94.27; 8/94.29
[58] Field of Search ................. 423/61, 117, 518, 548, 423/549, 556, 544, 595, 600, 128; 8/94.27, 94.29; 210/720; 204/135; 252/8.57

[56] References Cited

U.S. PATENT DOCUMENTS

| | | | |
|---|---|---|---|
| 1,663,435 | 3/1928 | Bradner et al. | 423/556 |
| 1,698,505 | 1/1929 | Marlatt et al. | 8/94.27 |
| 1,727,719 | 9/1929 | Kränzlein et al. | 8/94.27 |
| 2,215,183 | 9/1940 | Lawrence et al. | 423/556 |
| 2,459,289 | 1/1949 | Roehrich | 8/94.29 |
| 2,767,043 | 10/1956 | Ushakoff | 8/94.27 |
| 2,844,439 | 7/1958 | Schurr | 423/DIG. 2 |
| 3,078,146 | 2/1963 | Savage | 423/128 |
| 3,667,905 | 6/1972 | Jennings | 423/556 |
| 3,856,916 | 12/1974 | LeFoncois et al. | 423/544 |
| 4,483,829 | 11/1984 | Guardini | 423/544 |

FOREIGN PATENT DOCUMENTS

| | | | |
|---|---|---|---|
| 54-33895 | 3/1979 | Japan | 423/556 |
| 54-126694 | 10/1979 | Japan | 423/556 |
| 58-19610 | 4/1983 | Japan | 423/544 |
| 251267 | 4/1927 | United Kingdom | 8/94.27 |
| 524934 | 8/1940 | United Kingdom | 423/128 |
| 923958 | 4/1982 | U.S.S.R. | 423/544 |

*Primary Examiner*—Gary P. Straub
*Attorney, Agent, or Firm*—Keil & Weinkauf

[57] ABSTRACT

The invention relates to basic chromium aluminum sulfates which are soluble in cold water and are of the general formula

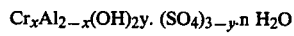

$$Cr_xAl_{2-x}(OH)_{2y}\cdot(SO_4)_{3-y}\cdot n\,H_2O$$

where x is from 0.1 to 1.9, y is from 0.01 to 2 and n is from 4 to 24, and a process for the preparation thereof. The process comprises reacting chromium (III)—containing waste sulfuric acid having a water content of 20–50% by weight with aluminum oxide and/or aluminum oxide hydroxide and/or aluminum hydroxide at a temperature of 100° to 200° C. The molten product is converted to droplet form and allowed to solidify in free fall.

3 Claims, No Drawings

BASIC CHROMIUM ALUMINUM SULFATES AND THEIR PREPARATION

The present invention relates to basic chromium aluminum sulfates which are soluble in cold water and are of the general formula

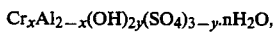

$Cr_xAl_{2-x}(OH)_{2y}(SO_4)_{3-y} \cdot nH_2O$, where x is from 0.1 to 1.9, y is from 0.01 to 2 and n is from 4 to 24, and a process for their preparation.

Many chemical syntheses in which oxidation is carried out using chromic acid (chromium-VI) produce chromium(III)-containing wate sulfuric acids which are difficult to dispose of. Such chromium(III)-containing waste sulfuric acids are also obtained, for example, when chemical substances which do not readily undergo biodegradation are eliminated by oxidation with chromic acid.

To date, chromium-free waste sulfuric acids have been disposed of by a method in which these acids are eithe neutralized with sodium hydroxide solution or lime, or are concentrated once again by evaporating down, for example by the submerged-combustion method. Both methods entail problems. In the first method, the resulting waste water has a salt load, or calcium sulfate has to be disposed of. The second method requires a large amount of energy and is frequently made difficult by the presence of impurities in the waste sulfuric acid.

In disposing of chromium(III)-containing waste sulfuric acids, it is necessary to separate off the chromium in additional operations. This is done, for example, as follows: milk of lime is added to the waste acid, the precipitated calcium sulfate is filtered off, and the remaining chromium-containing solution is evaporated down and finally spray-dried. It is obvious that such a process is expensive.

It is an object of the present invention to provide useful products obtainable from chromium-containing waste sulfuric acids, and a process by means of which these products can be obtained from chromium-containing waste sulfuric acids, without secondary products or by-products being formed, waste water problems resulting or waste products which have to be disposed of being obtained.

We have found that this object is achieved by water-soluble basic chromium aluminum sulfates of the general formula

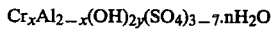

$Cr_xAl_{2-x}(OH)_{2y}(SO_4)_{3-y} \cdot nH_2O$ where x is from 0.1 to 1.9, y is from 0.01 to 2 and n is from 4 to 24, these compounds being advantageous tanning agents.

$Cr_xAl_{2-x}(OH)_{2y}(SO_4)_{3-y} \cdot nH_2O$ is a homogeneous compound which, compared with mixtures of basic chromium sulfate and aluminum sulfate, has a uniform color, specific melting characteristics and a specific solubility in, for example, $H_2O$. When the novel basic chromium aluminum sulfates are used as tanning agents, their solubility in cold water is of particular interest; under similar conditions, mixtures of basic chromium-(III) sulfate and basic aluminum(III) sulfate have a lower solubility in cold water. Those skilled in the art are familiar with the fact that solubility in the cold is one of the most important properties of a tanning agent.

The novel basic chromium aluminum sulfates can of course be synthesized from chromium salts, such as soluble chromium sulfate, and aluminum hydroxide and/or oxide hydroxide and/or oxide and sulfuric acid. However, they are advantageously prepared from chromium-containing waste sulfuric acids.

To prepare products having a specific chromium aluminum content and a specific basicity, the $Cr^{+++}/SO_4$ molar ratio in the chromium-containing waste sulfuric acid is adjusted if required, depending on the desired composition of the basic chromium aluminum sulfate. This can be done by adding $Cr^{+3}$ salts or sulfuric acid. Advantageously, the water content is then brought to 20–50% by weight, and aluminum oxide and/or aluminum oxide hydroxide and/or aluminum hydroxide are reacted with the solution.

Chromic acid oxidation reactions in organic chemistry generally give waste solutions which contain from 2.5 to 5.0% by weight of $Cr^{3+}$, from 60 to 70% by weight of $SO_4^{--}$ and from 30 to 40% by weight of $H_2O$.

If it is desired to prepare novel basic chromium aluminum sulfates having a substantially higher chromium content by the process according to the invention, it is necessary to use a waste acid having a higher chromium content and/or a lower sulfuric acid content. Such chromium-rich waste acids can be obtained if, for example, a further amount of chromic acid is added to waste acid which already has a chromium content, and the resulting mixture is used for a chromic acid oxidation.

Furthermore, waste acids which have a high chromium(III) content and a low sulfuric acid content may be obtained if organic compounds which do not readily undergo biodegradation and are present in waste sulfuric acids are disposed of by oxidation with chromium trioxide. Examples of compounds which do not readily undergo biodegradation are mononuclear or polynuclear aromatic compounds present in chlorinated, sulfonated and/or nitrated or amidated form. Such compounds, eg. 1-chloro-5-nitrotoluenesulfonic acid or isomers of this, can be completely destroyed in sulfuric acid at elevated temperatures, ie. by boiling with chromic acid, the sulfuric acid content of the solution generally being from 45 to 50%. In such an oxidation, the organic carbon is oxidized to $CO_2$, and the chloride to $Cl_2$. $NO_2$ and $SO_3H$ groups are converted to oxides of nitrogen and sulfuric acid respectively. Chromium(III)-containing waste sulfuric acid remains. The volatile gases, such as $CO_2$, $Cl_2$, $N_2$ or oxides of nitrogen, can be eliminated via washes, using a conventional process.

This gives waste acids which generally have a relatively high chromium content (as high as about 15% by weight) and a relatively low sulfate content (as low as 45% by weight). Hence, it is possible to state that chromium-containing waste acids obtained in industry generally have a chromium content of from 2.5 to 15% by weight, a sulfate content of from 45 to .70% by weight and a water content of from 30 to 40% by weight.

The maximum amount of aluminum compound added is determined by the maximum solubility of $Al(OH)_3$, ALOOH or $\gamma$-$Al_2O_3$ in the waste acid. The minimum amount is not less than 0.01 mole above the stoichiometric amount required for the formation of the sulfate of the general formula $M_2(SO_4)_3$, where M is $Cr^{+++}$ and $Al^{+++}$. Since tanning agents should be highly basic substances, it is necessary to aim for the upper limit of the Al content in the preparation of high-quality tanning agents.

In order that the product has good solubility, solidifies rapidly on cooling and is present in high concentration, it is advisable to bring the water content to 20-50%. Advantageously, the water content is adjusted in the waste acid itself, by distillation or by the addition of water. However, it is also possible to adjust the water content after reaction with the aluminum compound.

After the starting substances, the waste acid and, for example, aluminum hydroxide have been mixed homogeneously in a vessel, the suspension is pumped into a hydrothermal reactor, in which the mixture is reacted at from 100° to 200° C. The reaction is exothermic, which means that the suspension undergoes reaction with evolution of heat when warmed to a certain threshold temperature, eg. 60° C., as a rule temperatures above 100° C. being reached without further supply of heat. At above 100° C., the reaction time is very short, being only a few minutes, for example, at 140° C. The reaction is carried out in a hydrothermal reactor, eg. a tube reactor.

When the reaction is complete, the product is present in the form of a viscous solution in its own water of crystallization. This solution is processed so that it is converted into fine droplets, for example via a nozzle, and these droplets are cooled in free fall and hence solidify. In order to reduce the solidification time or the height of all, the product can be cooled to such an extent before spraying that the temperature is just above the crystallization temperature, which is generally from 90° to 130° C. Cooling the product during free fall to a few degrees below the crystallization temperature is sufficient for the product to combine with the water present, this becoming the water of crystallization, and to solidify.

It should be noted that, in the process according to the invention, a low sodium concentration, which may result from, for example, the use of sodium dichromate instead of chromic acid in the chromic acid oxidation, does not have an interfering effect. The sodium sulfate present in the waste acid is subsequently present as a mixture with the product, but does not interfere with the activity of the latter. Organic impurities in the tanning agent, which may lead to graying of the leather, can be readily oxidized by adding an equivalent amount of chromium trioxide, the total amount of organic carbon being converted to $CO_2$, and the hexavalent chromium ions being reduced to trivalent ones.

The resulting combined basic chromium aluminum sulfates can be used as tanning agents.

The combined chromium aluminum tanning agents according to the invention have the advantage that they can be prepared from a waste product which as such is useless, ie. chromium-containing waste sulfuric acids which are expensive to eliminate or dispose of. It is noteworthy that no by-products, secondary products or waste products are obtained, nor are there any residual solutions to be disposed of. Virtually the entire amount of the waste acids can therefore be utilized, creating an extremely economical raw material base for the novel products. Compared with pure chromium tanning agents, the compounds according to the invention have the advantage that, because of their lower chromium content, they reduce the chromium load in the waste waters from tanneries.

One of the most important properties required of the novel water-soluble basic chromium aluminum sulfates is a high solubility in the cold, ie. the tanning agent must dissolve very rapidly in water at room temperature tp give a highly concentrated solution.

The maximum chromium and aluminum content of the solution which are obtained in 30 minutes at 20° C. are determined, this being the test condition employed.

The experiments showed that, compared with a mechanically prepared mixture of chromium and aluminum tanning agents, the Cr/Al product prepared according to the invention was as much as twice as soluble in the cold, depending on the Cr/Al ratio, but in any case had a higher solubility in the cold. Novel compounds of the above formula where x is greater than 0.2 have particularly good solubilities.

EXAMPLE 1

A 10 kg sample of a chromium(3+)-containing waste sulfuric acid is placed in each of several 16 liter autoclaves which are connected to the same atomizing nozzle via siphon tubes. The waste acid obtained in the preparation of indanthrene has the following composition, determined by analysis:

$Cr^{3+}$: 3.2% by weight
$Na^+$: 1.4% by weight
$SO_4^{2-}$: 62.6% by weight
$H_2O$: 32.5% by weight 3,000 g of $Al(OH)_3$ are added to the initially taken acid at room temperature. The reaction vessels are closed, and are heated at 80° C., while stirring. The reaction which takes place is exothermic, and the reaction mixture warms up to 125° C., and is kept at 140° C. for a further 15 minutes. Under a kettle pressure of 6 bar in each case, the kettles are then emptied in succession via a two-material nozzle (compressed air atomizer 15 bar). This converts the reaction mixture into fine droplets, which solidify in free fall (height of fall 1.5 m). In this quasi-continuous procedure, the chromium-containing basic aluminum salt is obtained in a finely divided solid form, and has the following composition, determined by analysis:

$Cr^{3+}$: 2.5% by weight $\hat{=}$ 3.65% of $Cr_2O_3$
$Al^{3+}$: 8.3% by weight $\hat{=}$ 15.60% of $Al_2O_3$
Na: 1.1% by weight
$SO_4^{2-}$: 51.0% by weight
$OH^-$; $H_2O$: 37.1% by weight.

This corresponds to the formula:

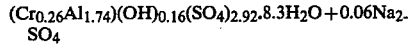

$$(Cr_{0.26}Al_{1.74})(OH)_{0.16}(SO_4)_{2.92} \cdot 8.3H_2O + 0.06Na_2SO_4$$

1 g of substance dissolves in 1 ml of $H_2O$ at 25° C.

EXAMPLE 2

When the waste acid from Example 1 is reused in a further $Cr^{+6}$ oxidation, a waste acid having the following composition is obtained:

$Cr^{+3}$: 9.1% by weight
$Na^+$: 3.8% by weight
$SO_4^{2-}$: 43.3% by weight
$H_2O$: 43.8% by weight.

10,050 g of this acid are reacted with 650 g of $Al(OH)_3$ in a 16 liter autoclave. The kettle is heated to 120° C. and the reaction mixture is stirred for 30 minutes, after which it is cooled to 100° C., the pressure is let down, and 1,750 ml of $H_2O$ are distilled off from the kettle in order to increase the viscosity of the product. The viscous product is then forced out of the kettle under 10 bar via a heated siphon tube, and is atomized by means of a two-material nozzle (compressed air under 15 bar at the nozzle). The product, which is converted to fine droplets, solidifies during free fall (height of fall 1.5 m). It is obtained in solid form, is very soluble in water and has the following composition according to analysis:
$Cr^{3+}$: 10.7% by weight $\doteq$ 15.6% of $Cr_2O_3$
$Al^{3+}$: 2.7% by weight $\doteq$ 5.1% of $Al_2O_3$
$Na^+$: 4.4% by weight
$SO_4^{2-}$: 50.5% by weight
$OH^-,H_2O$: 31.7% by weight.
This corresponds to the formula:

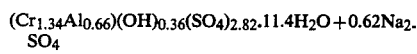
$(Cr_{1.34}Al_{0.66})(OH)_{0.36}(SO_4)_{2.82}.11.4H_2O + 0.62Na_2.SO_4$ The resulting tanning agent is used for tanning delimed cattle pelt. For this purpose, 100 parts of the stated pelt (split to a thickness of 3 mm) are pickled at 22° C. in 50 parts of water which contain 5 parts of sodium chloride, 0.7 part of 85% strength formic acid and 0.4 part of 96% strength sulfuric acid, in a drum. Drumming is carried out for 90 minutes, after which the pickling liquor has a pH of 3.5. 10 parts of the tanning agent prepared as described above are then added to this liquor, after which drumming is continued for 2 hours and the pH is increased to 3.9 in the course of one hour with 1 part of sodium formate and 1 part of sodium bicarbonate. Drumming is carried out for a further 4 hours at this pH.

The resulting leathers have a shrinking temperature of 97° C. and a pale natural color.

EXAMPLE 3

A waste sulfuric acid which contains a hydrocarbon which is based on 1-chloro-5-nitrotoluenesulfonic acid and does not readily undergo degradation is first converted to a $Cr^{3+}$-containing waste sulfuric acid by reaction with chromic acid. To do this, 5,000 g of the waste acid having the composition
Total carbon:
  C: 2.7% by weight
  $N_2$: 0.4% by weight
  $Cl^-$: 1.2% by weight
  $SO_4^{2-}$: 56.4% by weight
  $H_2O$: 39.3% by weight
are reacted with 1,495 g of $CrO_3$. The waste acid is first heated to 50°-60° C. in a reaction vessel equipped with an intensive reflux condenser, after which the chromic acid is added a little at a time, over a period of 2 hours. The thoroughly stirred reaction mixture warms up to 125°-130° C. and refluxes. After the chromic acid has been introduced, refluxing is continued for a further hour. When the reaction is complete, the $Cr^{3+}$-containing waste acid has the following composition:
$Cr^{3+}$: 11.7% by weight
Total carbon:
  C: 0.015% by weight
$SO_4^{2-}$: 47.25% by weight and
$H_2O$: remainder.

5,000 g of the waste acid of the stated composition are initially taken in a 16 liter autoclave, 750 g of $Al(OH)_3$ are added, the kettle is closed and heated to 140° C., and the reaction mixture is stirred at this temperature for 3 minutes. The kettle pressure is then increased to 15 bar by means of compressed air, and the viscous reaction product is forced through a siphon tube to a nozzle, where it is atomized with compressed air under 20 bar and then solidified during free fall (height of fall 1.5 m).

The solid product is water-soluble and has the following composition according to analysis:
$Al^{3+}$: 4.8% by weight $\doteq$ 9.02% of $Al_2O_3$
$Cr^{3+}$: 11.2% by weight = 16.35% of $Cr_2O_3$
$SO_4^{2-}$: 45.2% by weight and
$OH^-,H_2O$: 38.8% by weight.
This corresponds to the formula:

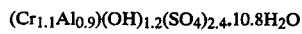
$(Cr_{1.1}Al_{0.9})(OH)_{1.2}(SO_4)_{2.4}.10.8H_2O$

The resulting tanning agent is used, as described in Example 2, for tanning delimed cattle pelts. Leather which is resistant to the boiling test is obtained.

EXAMPLE 4

The solubility in the cold of the product from Example 3 (A) is compared with that of a product (B) prepared by mixing basic chromium sulfate with basic aluminum sulfate.

(A) 6 g of basic chromium aluminum sulfate from Example 3
$Cr^{3+}$ content: 0.672 g
$Al^{3+}$ content: 0.288 g (B) Comparative sample, prepared by mixing (a) 2.46 g of basic aluminum sulfate, having the composition:
$Al^{3+}$: 11.9% by weight
$SO_4^{2-}$: 44.2% by weight and
$OH^-,H_2O$: 43.9% by weight
with (b) 3.77 g of basic chromium sulfate, having the composition:
$Cr^{3+}$: 17.8%
$SO_4^{2-}$: 50.4% and
$OH^-,H_2O$: 31.8%.
The mixture (6.23 g) has the composition:
$Cr^{3+}$: 0.67 g and
$Al^{3+}$: 0.29 g 6 g samples of (A) and (B) are introduced into 5 ml of $H_2O$, and the two samples are shaken for 30 minutes at room temperature (20° C.) and then filtered. The residue is dried and weighed.

In this period, 5.66 g of sample (A) have dissolved, whereas only 2.55 g of sample (B) have gone into solution.

EXAMPLE 5

The solubility in the cold of the product from Example 1(A) is compared with that of a product (B) prepared by mixing basic chromium sulfate with basic aluminum sulfate.

(A) 5 g of basic chromium aluminum sulfate from Example 1
$Cr^{3+}$ content: 0.125 g
$Al^{3+}$ content: 0.415 g (B) Comparative sample, prepared by mixing 3.48 g of basic aluminum sulfate, having the composition:
$Al^{3+}$: 11.9% by weight
$SO_4^{2-}$: 44.2% by weight and
$OH^-,H_2O$: 43.9% by weight
with 0.7 g of basic chromium sulfate, having the composition:
$Cr^{3+}$: 17.8% by weight
$SO_4^{2-}$: 50.4% by weight and
$OH^-,H_2O$: 31.8% by weight.
The mixture (4.18 g) has the composition:
$Cr^{3+}$: 0.125 g and
$Al^{3+}$: 0.415 g.

The maximum water-solubility of samples (A) and (B) at room temperature is determined for a period of 30 minutes. In this period, 1.02 g/ml of sample (A) have dissolved, whereas only 0.92 g/ml of sample (B) have gone into solution.

Furthermore, the IR spectra of the two products differ from one another. In the IR spectra recorded using a KBr pellet, the product from (5A) (corresponding to Example 1) has a very pronounced peak at 1,102 cm$^{-1}$, whereas the product from (5B), which is prepared by mechanical mixing, exhibits a double peak at 1,113 and 1,079 cm$^{-1}$.

We claim:

1. A process for the preparation of water-soluble basic chromium aluminum sulfate based tanning agent having a high rate of solubility at room temperature of the formula $$Cr_xAl_{2-x}(OH)_{2y}(SO_4)_{3-y}\cdot nH_2O$$

where
  x is from 0.1 to 1.9,
  y is from 0.01 to 2 and
  n is from 4 to 24,
which process comprises
  (a) using chromium (III)-containing waste sulfuric acid as a starting material,
  (b) concentrating said acid to a water content of 20–50% by weight,
  (c) adding to the acid (b) an aluminum compound selected from the group comprising aluminum oxide and/or aluminum oxide hydroxide and/or aluminum hydroxide in an amount which is not less than 0.01 mole above the stoichiometric amount required for the formation of the sulfate of the formula $M_2(SO_4)_3$ where M is Al or Cr,
  (d) reacting the mixture at a temperature of from 100° to 200° C.,
  (e) converting the molten product to droplet form and solidifying the droplets in free fall.

2. A process according to claim 1, wherein the molten reaction product is cooled to just above its solidification point before being converted to droplet form.

3. A process according to claim 1, wherein x is from 0.2 to 1.9.